March 27, 1956  J. C. REED  2,739,508
REAR VISION GLASSES
Filed Oct. 9, 1952
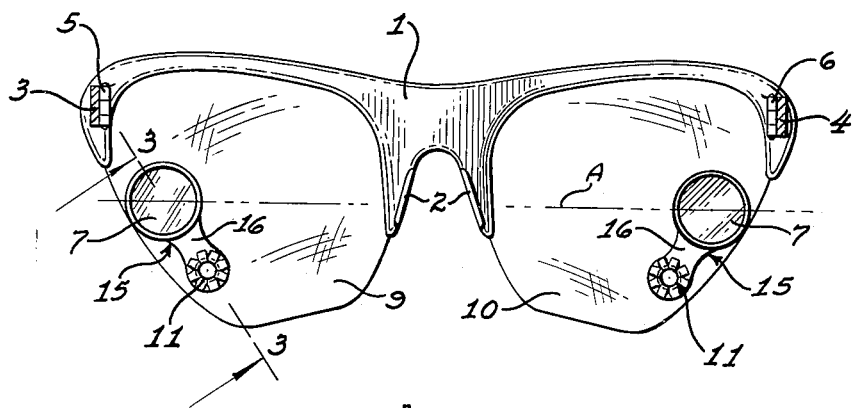
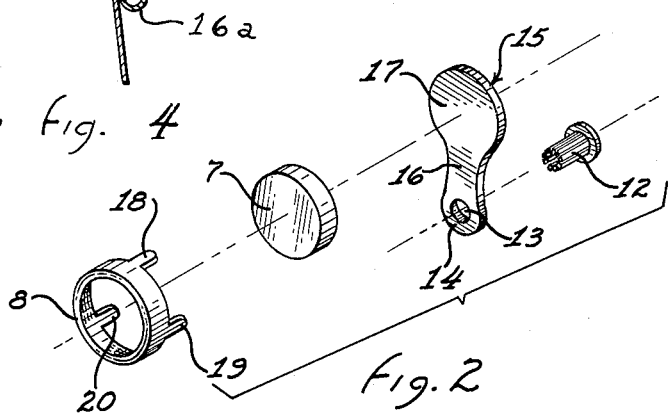
INVENTOR.
JOHN C. REED.
BY Willard S. Govert
ATTORNEY.

United States Patent Office 2,739,508
Patented Mar. 27, 1956

2,739,508

REAR VISION GLASSES

John Charles Reed, Chandler, Ariz., assignor of fifty per cent to Donald E. Goley, Phoenix, Ariz.

Application October 9, 1952, Serial No. 313,875

2 Claims. (Cl. 88—41)

This invention pertains to improvements in eye-glasses and spectacles, and is particularly directed to improvements in rear vision glasses.

An object of this invention is to provide a pair of spectacles or eye-glasses with small reflecting mirrors secured in a strategic location and by a unique mounting mechanism to the lens whereby the user can see rearwardly on either side.

Another object of this invention is to provide an improved spectacle or eye-glass assembly carrying a pair of rear view mirrors in association with the regular lenses in a manner not to obstruct normal vision through the lenses while at the same time making possible the viewing of objects behind the wearer of the glasses.

Still another object of this invention is to provide an improved pair of rear vision glasses of simple design and construction including a novel arrangement of reflecting mirrors and mounting means therefor in connection with the glasses which is both efficient in use and economical to manufacture commercially in large scale production.

Further features and advantages of this invention will appear from a detailed description of the drawings in which:

Fig. 1 is a rear view of a pair of glasses with rear view mirrors incorporating the features of this invention.

Fig. 2 is an exploded view showing the parts and method of assembly of the novel rear view mirror holding assembly.

Fig. 3 is a section on the line 3—3 of Fig. 1.

Fig. 4 is a section similar to Fig. 3 but showing another method of mounting the rear view mirrors.

For exemplary purposes this invention is shown applied to a pair of spectacles or eye-glasses comprising a frame 1 having the nose piece portion 2 and the ear bars 3 and 4 suitably secured to the frame by the hinges 5 and 6 respectively.

A pair of rear view mirrors 7 are each preferably positioned on a horizontal line A passing substantially through the mid points of the lenses 9 and 10 carried in the frame 1 of the glasses. The lenses may be made of plastic, glass, or other suitable material and are each formed with an opening at 11 through which passes a rivet 12 which in turn passes through the opening 13 in the lower end 14 of a mounting member indicated generally at 15. The member 15 has a neck portion 16 terminating in a circular or disc shaped portion 17 of substantially the same size as the mirrors 7. A clamping cover 8 having prongs 9, 10, and 11 fits over the mirror 17 and the prongs 18, 19 and 20 are bent down as best seen in Fig. 3, over the rear face 17a of the portion 17 of the support member 15. The stem portion 16 is carefully designed so that the mirrors 17 may be adjusted in up and down and horizontal reflecting positions independent of the focus or position of the lens 10 so that the mirrors may be readily adjusted immediately and without tools of any kind to each individual wearer to enable him to get the most satisfactory vision to the rear to suit his particular pupil arrangement.

Fig. 4 shows another method of mounting the mirrors on the lenses in which the member 16 is bent and turned under at 16a and the mounting rivet 12 placed behind the mirror 7 so as to in no way obstruct the lens below the rear-view mirror.

There has thus been provided a rear view mirror mounting of flexible and durable design and which permits independent positioning of the reflecting mirror 7 in any desired position with a minimum of effort and skill relative to the main lenses and frame of the glasses so that they are easily adapted to immediate use by any purchaser of the spectacles. Further, the structure particularly shown in Fig. 2 is of rigid durable design, simple to manufacture and fabricate, and easy to install upon the lenses 9 or 10, or, if desired, on the actual frame 1 of the glasses.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by the United States Letters Patent is:

1. A pair of rear vision glasses comprising, a frame, a pair of ear bars, hinge means securing the forward portions of said ear bars to said frame, lenses in said frame, a nose bar interconnecting said lenses, means for securing a reflecting rear view mirror on each of said lenses in a horizontal plane passing substantially through the center of said lenses said means comprising, a mounting member, a mounting portion on said member having a mounting hole, a rivet passing through said hole and through the lower outside portion of said lenses independent of the nose bar of said glasses, a mirror supporting portion on said member, a flexible stem portion interconnecting said mounting and mirror supporting portions of said member, a mirror securing ring located over said mirror, and securing lugs on said ring bendable behind said mirror securing portion of said mounting member.

2. A device for securing a rear view mirror for independent adjustment on a lens of a pair of glasses having a frame and a nose bar comprising, a mounting member, a mounting portion on said member, a mirror supporting portion on said mounting member, an interconnecting flat flexible stem integrally formed with said mounting and mirror supporting portions, a reflecting mirror, a means extending through the lower outside portion of a lens independent of the nose bar and frame of the glasses to secure said stem on said lens, means for securing said mirror to said mirror supporting portion comprising, a ring member surrounding said mirror, an inwardly projecting annular flange on said ring member, and projecting lugs on the inner edge of said annular flange bent over the mirror supporting portion of said mounting member.

References Cited in the file of this patent

UNITED STATES PATENTS

| 459,563 | Groh | Sept. 15, 1891 |
| 1,074,145 | Walts | Sept. 30, 1913 |
| 1,892,365 | Rowan | Dec. 27, 1932 |
| 1,916,110 | Julien | June 27, 1933 |

FOREIGN PATENTS

| 300,904 | Italy | Sept. 21, 1932 |